United States Patent
Bromfman et al.

(10) Patent No.: US 12,288,884 B2
(45) Date of Patent: Apr. 29, 2025

(54) DISPERSION OF SMALL SCALE MATERIALS VIA CAVITATION

(71) Applicant: CENS MATERIALS LTD., Beer-Sheva (IL)

(72) Inventors: Michael Bromfman, Omer (IL); Einat Schur, Susya (IL)

(73) Assignee: CENS MATERIALS LTD., Beer-Sheva (IL)

(*) Notice: Subject to any disclaimer, the term of this patent is extended or adjusted under 35 U.S.C. 154(b) by 1016 days.

(21) Appl. No.: 17/295,054

(22) PCT Filed: Nov. 19, 2019

(86) PCT No.: PCT/IB2019/059927
§ 371 (c)(1),
(2) Date: May 19, 2021

(87) PCT Pub. No.: WO2020/104937
PCT Pub. Date: May 28, 2020

(65) Prior Publication Data
US 2022/0006092 A1 Jan. 6, 2022

Related U.S. Application Data

(60) Provisional application No. 62/769,015, filed on Nov. 19, 2018.

(51) Int. Cl.
*B82Y 40/00* (2011.01)
*B01F 25/431* (2022.01)
(Continued)

(52) U.S. Cl.
CPC .......... *H01M 4/625* (2013.01); *B01F 25/431* (2022.01); *B01F 27/112* (2022.01); *B01F 31/87* (2022.01);
(Continued)

(58) Field of Classification Search
CPC ........ B01F 23/00; B01F 31/80; B01F 31/831; B01F 31/97; B01F 27/112; B82Y 30/00; B82Y 40/00; G01N 1/38
See application file for complete search history.

(56) References Cited

U.S. PATENT DOCUMENTS 5,316,591 A 5/1994 Chao et al.
5,607,518 A 3/1997 Hoffman et al.
(Continued)

FOREIGN PATENT DOCUMENTS

CN 1528672 A 9/2004

OTHER PUBLICATIONS

Sazgarnia et al., "Monitoring of Transient Cavitation Induced by Ultrasound and Intense Pulsed Light in Presence of Gold Nanoparticles," Ultrasonics Sonochemistry, vol. 21, No. 1, Jan. 21, 2014, pp. 268-274, Elsevier B.V., Amsterdam, Netherlands.
(Continued)

*Primary Examiner* — Jill A Warden
*Assistant Examiner* — Dwayne K Handy
(74) *Attorney, Agent, or Firm* — The Roy Gross Law Firm, LLC; Roy D. Gross

(57) ABSTRACT

There is provided methods and systems for disaggregation and deagglomeration of small scale materials such as carbon nanotubes by cavitation of a treatment substance. The treatment substance may be a substance such as $CO_2$ which is capable of undergoing phase changes. Systems must be capable of withstanding high pressures, and cavitation may be done by ultrasound, mechanical agitation, injection of a jet stream, or other methods. Materials treated via the methods of the invention may be removed without the use of chemical surfactants or other chemical modification means, and may be further used in a battery.

10 Claims, 12 Drawing Sheets

(51) Int. Cl.
- *B01F 27/112* (2022.01)
- *B01F 31/87* (2022.01)
- *B01F 33/40* (2022.01)
- *B01F 35/92* (2022.01)
- *C01B 32/174* (2017.01)
- *H01M 4/62* (2006.01)
- *B01F 35/90* (2022.01)
- *B82Y 30/00* (2011.01)

(52) U.S. Cl.
CPC .......... *B01F 33/402* (2022.01); *B01F 35/92* (2022.01); *C01B 32/174* (2017.08); *B01F 25/43163* (2022.01); *B01F 2035/99* (2022.01); *B82Y 30/00* (2013.01); *B82Y 40/00* (2013.01); *C01B 2202/22* (2013.01); *C01P 2004/03* (2013.01)

(56) References Cited

U.S. PATENT DOCUMENTS

| | | | |
|---|---|---|---|
| 2010/0254888 | A1 | 10/2010 | Kawakami et al. |
| 2012/0241692 | A1* | 9/2012 | Yajima .................. C08J 3/128 977/734 |
| 2016/0020466 | A1 | 1/2016 | Ulbrich et al. |
| 2016/0039679 | A1* | 2/2016 | Krishnan ............... B01J 19/26 516/9 |
| 2016/0280551 | A1 | 9/2016 | Hasegawa et al. |
| 2018/0183047 | A1* | 6/2018 | Sakamoto ............. C01G 53/50 |

OTHER PUBLICATIONS

Yang et at., "Reduced Graphene Oxide/Carbon Nanotube Composites as Electrochemical Energy Storage Electrode Applications," Nanoscale Research Letters, vol. 13, No. 1, Jun. 15, 2018, Springer Science+ Business Media, Berlin/Heidelberg, Germany.

* cited by examiner

DISPERSION OF SMALL SCALE MATERIALS VIA CAVITATION

CROSS-REFERENCE TO RELATED APPLICATIONS

This application claims the benefit of priority from U.S. Provisional Patent Application No. 62/769,015, filed on Nov. 19, 2018.

FIELD

The invention is directed to methods of dispersion of small-scale materials, such as carbon nanotubes and to systems for performing such methods.

More specifically, the invention is directed to methods for providing a carbon nanotube/electrode substrate matrix for improved performance of energy storage devices.

BACKGROUND

Small scale materials in the micro- and nano-scale range are used in many applications. More specifically, carbon nanotubes (CNTs) are graphite sheets that have been rolled into a cylindrical tube. Due to their high aspect ratio, CNTs are considered to be nearly one-dimensional objects. CNTs can be single walled or multi-walled tubes which all have a low density, high rigidity (Young's modulus of the order of 1 TPa), high tensile strength, and high thermal and electric conductivity.

CNTs, single and/or multiwalled, are employed as composite materials to increase the mechanical and conductive properties of materials, coatings, films, and microelectronics. In the field of energy storage devices, CNTs increase the electric conductivity of commercial cathode materials at already very low mass percentage. In addition, the mechanical properties of CNTs can buffer the volumetric changes of electrodes during charge/discharge cycling of, for example, Li-Ion batteries.

Despite their extraordinary electrical, thermal and mechanical properties, the potential use of CNTs for increase in performance of supercapacitors and batteries is limited because use of CNTs requires the control of the microstructure of the CNT materials. The formation of a dispersion and arrangement of CNTs in the matrix remains challenging as a result of strong interaction forces between CNTs. The Van der Waals interactions cause the bundle and cluster formation in as-produced CNTs. This aggregate or agglomerate formation leads to a reduction of performance in their mechanical and electrical behaviors. Disaggregation of MWCNT has been achieved by mechanical methods such as e.g. shear mixing, shear milling and ultrasonication of MWCNT dispersed in a liquid, organic or aqueous, or by a combination with chemical methods including surface functionalization, and the addition of surfactants, in some cases in combination with centrifugation steps. The disaggregation of SWCNTs requires higher energy levels in comparison to MWCNTs, which can be obtained only by ultrasonication.

Some techniques suggest that after the dispersion and sonication, the CNTs can be dried and re-dispersed. However, with regard to the application of CNTs in electrochemical cells the common techniques change the surface chemistry or introduce additional unwanted foreign material, or damage the CNT structure, any or all of which lower the electrical and/or thermal conductivity and decrease the quality of the electrochemical cells.

There is thus a need for a method of dispersion of small scale materials which is devoid of the above limitations.

SUMMARY

The invention, in embodiments thereof, relates to a method for the disaggregation and deagglomeration of small-scale materials. Small scale materials are defined herein as materials having particles in the micro- and nano-scale range, and may include, for example, inorganic pigments such as $TiO_2$, $Fe_2O_3$, organic fluorescent pigments from rhodamine group, from phtalocyanide group, abrasive powder such as corund, diamond, and carbon nanotubes (CNT). The method of the invention is directed to these small-scale materials and their dispersion and formation of a physical network with electrode substrate particles. More particularly the invention relates to the disaggregation and deagglomeration of carbon nanotubes via cavitation. More particularly the invention relates to the disaggregation and deagglomeration of carbon nanotubes based on the application of a cavitator, such as an ultrasound probe, in dense-phase fluids, and more particularly, using ultrasonication in liquid $CO_2$ or $CO_2$ under supercritical conditions. More particularly the invention relates to use of particles of electrode materials prepared with carbon nanotubes for the improved performance of energy storage devices including, but not limited to supercapacitors of either the aqueous or organic solvent electrolyte types, Ni/metal hydride batteries, lead-acid batteries, and Li-ion and lithium-ion polymer batteries. The invention uses a process that creates a 3D-network of carbon nanotubes with substrate particles without the use of surfactants or covalent modification of the carbon nanotubes or substrate particles.

The term electrode substrate particle refers to nano- and micron particles that are used as electrode materials.

The term battery herein refers to batteries or supercapacitors comprised of at least one cell or a plurality of cells, connected in series, parallel or combinations.

There is provided, in accordance with embodiments of the invention, a method for dispersion of small scale materials such as carbon nanotubes. The method includes placing a small scale material powder into a treatment chamber, introducing a treatment substance into the treatment chamber, the treatment substance being capable of undergoing cavitation, and cavitating the treatment substance to cause dispersion of the small scale material.

In accordance with further features in embodiments of the invention, the small scale material may be $TiO_2$, $Fe_2O_3$, organic fluorescent pigment from a rhodamine group, organic fluorescent pigment from a phtalocyanide group, corund powder, diamond powder, or carbon nanotubes, or other suitable materials.

In accordance with further features in embodiments of the invention, the dry carbon nanotube powder is mixed with an electrode substrate material and placed together into the treatment chamber. The carbon nanotubes have an electrical affinity to the electrode substrate material such that the dispersed carbon nanotubes establish stable contact with the electrode substrate material, thus forming a dispersed CNT/electrode substrate matrix.

In embodiments of the invention, the treatment substance may be carbon dioxide—in liquid or supercritical form—or mixtures of carbon dioxide with other gases, or other suitable materials. The treatment substance may undergo phase changes before or during treatment. The cavitating may be done by applying ultrasound to the treatment substance at a high pressure (for example, greater than or equal to 74 bar for supercritical $CO_2$ or 40-60 bar for liquid $CO_2$ at room temperature), or may be done by mechanical agitation or by repeatedly increasing and decreasing a pressure in the treatment chamber, or by injection of a jet stream of supercritical $CO_2$, or by other suitable methods. The method may include increasing a temperature of the treatment chamber during cavitation.

In further features in embodiments of the invention, the method also includes removing the dispersed small scale particles from the treatment chamber without changing a chemical composition of the nanotube particles. The small scale material may then be used in a battery.

There is provided, in accordance with embodiments of the invention, a system for disaggregation and deagglomeration of carbon nanotubes. The system includes an AMT vessel having a treatment chamber which is configured to hold therein a CNT/electrode substrate mixture, and is configured to withstand a pressure of at least 40-60 bar, and in some embodiments at least 70 bar, and in some embodiments at least 100 bar. The system further includes an external source of a treatment substance capable of undergoing cavitation, and a cavitator for causing cavitation of the treatment substance in the treatment chamber.

In further features in embodiments of the invention, the AMT vessel includes a bottom portion and a top portion positionable on top of the bottom portion, such that when the top portion is positioned on top of the bottom portion, the top and bottom portion form the treatment chamber. In embodiments of the invention, the AMT vessel includes a treatment substance feeding pipe through the top portion.

In further features in embodiments of the invention, the cavitator may be an ultrasound probe, and the top portion includes a probe insert through which at least a portion of the ultrasound probe can be introduced into the treatment chamber. In other embodiments, the cavitator may be an injector for injecting high speed jet stream of treatment substance into the treatment chamber. The treatment chamber may be, for example, a pipe AMT vessel.

There is provided, in accordance with additional embodiments of the invention, a dispersed CNT/electrode substrate matrix material, including a carbon nanotube material and an electrode substrate material which is configured to have an electrical affinity with the carbon nanotube material, wherein the carbon nanotube material is dispersed on the electrode substrate material in a stable form, thus forming the dispersed CNT/electrode substrate matrix. This matrix may be used in a battery.

Unless otherwise defined, all technical and scientific terms used herein have the same meaning as commonly understood by one of ordinary skill in the art to which this invention belongs. Although methods and materials similar or equivalent to those described herein can be used in the practice or testing of the embodiments of the invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of various embodiments of the invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several embodiments of the invention may be embodied in practice.

In the drawings.

Figure 1:
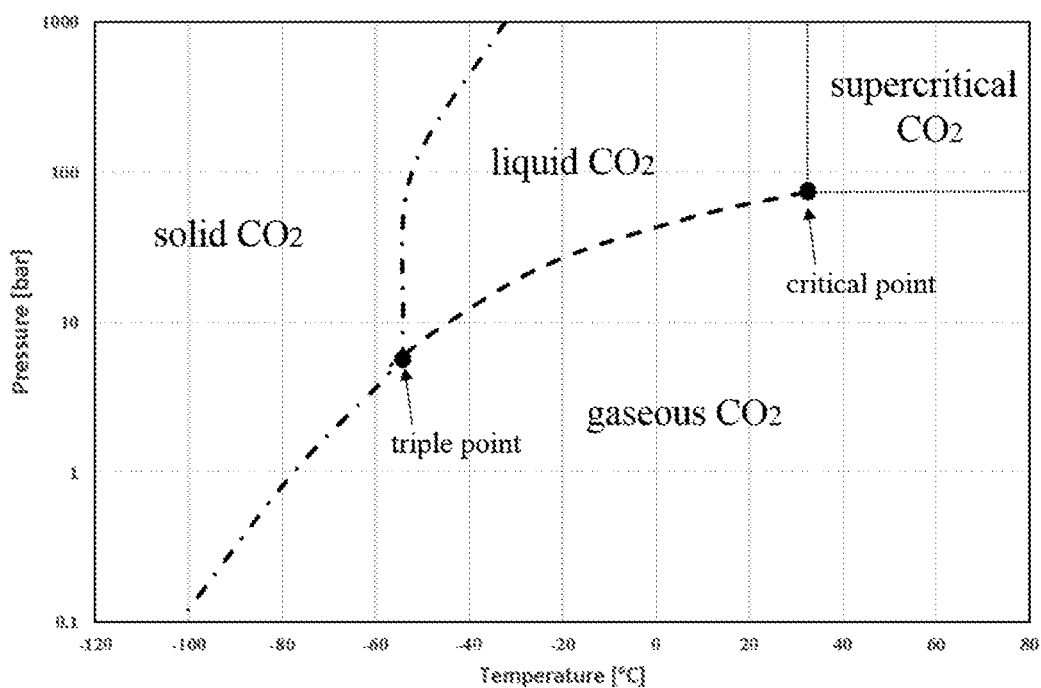
FIG. 1 is an illustration of a pressure-temperature (P, T) phase diagram of $CO_2$.

It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of the invention. It will be understood by those of ordinary skill in the art that embodiments of the invention may be practiced without these specific details. In other instances, well-known methods, procedures, components and structures may not have been described in detail so as not to obscure the invention.

The invention relates to systems and methods of treatment of carbon nanotubes. The systems and methods of the invention allow for advanced material treatment (AMT) to disperse (disaggregate and deagglomerate) small scale materials such as CNTs via cavitation in a treatment substance, wherein the treatment substance is in a shared physical space with the small scale materials. The term "dispersion" is intended to include both deagglomeration, which is production of smaller sized particles from an agglomerate, and disaggregation, which is separation of particles from one another by, for example, breaking of bonds. Further advantages of the design of the system and methods of the invention will be described hereinbelow.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description and should not be regarded as limiting.

The invention is for a method of advanced material treatment (AMT), which disperses (i.e. disaggregates and deagglomerates) small scale materials such as carbon nanotubes (CNTs) with the aid of a treatment substance, wherein the treatment substance undergoes cavitation while in a shared physical space with the CNTs. Cavitation is a process wherein mechanical stress in a substance causes collapse of microscopic bubbles. The treatment substance may be, for example, carbon dioxide ($CO_2$). Advantages of $CO_2$ are that it has four distinct phases, each of which may be beneficial, alone or in combination, for the treatment of CNTs as will be described. Reference is now made to FIG. 1, which is an illustration of a pressure-temperature (P, T) phase diagram of $CO_2$. As shown in FIG. 1, the phase may be controlled by adjusting the pressure and/or the temperature. In some embodiments, liquid $CO_2$ is used as the treatment substance. Liquid $CO_2$ is advantageous for CNT dispersion as compared to other liquids such as water or organic solvents, since it enables more efficient CNT dispersion and does not add any impurities to the final product, since the $CO_2$ can be removed completely in its gaseous form. In some embodiments, supercritical $CO_2$ ($scCO_2$) is used as the treatment substance. $ScCO_2$ has the same advantage as liquid $CO_2$, with the added advantage that it has density values which are similar to a liquid (i.e. relatively high as compared to gas) and viscosity values which are similar to a gas (i.e. relatively low as compared to liquid). As such, sound waves or other waves are able to propagate therethrough efficiently. In some embodiments, the treatment substance may change phase during the treatment process, for example, with a raise in temperature as a result of energy dissipation with sonication or as result of external heating or by changes in pressure. In other embodiments, the treatment substance does not change phase.

Alternatively, the treatment substance may be, for example, mixtures of $CO_2$ with other gases, such as $CO_2/N_2$, $CO_2/NH_3$ or others. Other gases which have critical temperatures in a range of 0 degrees to 200 degrees Celsius, and with critical pressures between 1 bar and 400 bar may be used as well.

A particular feature of the invention is that the treatment substance does not have a chemical interaction with the CNTs, thus enabling removal of the dispersed CNTs without the use of surfactants or other chemical means. Moreover, there is no covalent modification of carbon nanotubes which can significantly degrade the electronic and mechanical properties of the electrode materials of the supercapacitor and battery electrodes.

The treatment substance is configured to undergo cavitation via any number of methods. As an unlimiting example, $scCO_2$ may be used in combination with ultrasound. The supercritical phase is a single phase which occurs above the critical temperature $T_c$ and critical pressure $P_c$, and it has intermediate properties (e.g. viscosity, density, diffusion coefficient) of a gas and a liquid. Liquid $CO_2$ is a colorless liquid that exists only at pressures higher than P=5.2 bar (triple point $T_t$=−56.6° C.). In this example, $scCO_2$ or liquid $CO_2$ is used in combination with ultrasound for the deagglomeration and/or disaggregation of multi- and single walled CNTs and for the creation of a 3-D structure with electrode substrate particles. The 3-D structure is a dispersed network of CNTs and electrode (cathode and/or anode) particles. Alternatively, cavitation may also be accomplished by a flow of $scCO_2$ through an area of sharp pressure fluctuations and sharp flow velocity fluctuations; or via a jet stream of $scCO_2$ flowing through liquid $CO_2$ at a high speed; or via mechanical agitation, which can tear flow of $scCO_2$ into droplets and/or cavities; or by other suitable means. The $CO_2$ used can be of any grade of purity. Many other treatment substances and cavitation methods can be used in the invention, as will be described in embodiments hereinbelow.

The carbon nanotubes can be single-walled (SWCNT) or multi-walled (MWCNT), or a mixture in any ratio of SWCNT with MWCNT, open or closed end, or imperfect, or combinations of these. The carbon nanotubes can be of any length, chirality, and diameter. The carbon nanotubes can be of any purity grade and surface chemistry.

The carbon nanotubes are provided together with electrode substrate particles. The electrode substrate particles can be of any chemical composition, surface chemistry, and any physical structure with particle sizes between 5 nanometers and 1 millimeter. Examples of anode substrate particles for lithium-ion batteries include, but are not limited to, activated carbon, graphite, graphene, spheroidal graphite, hard carbon, soft carbon, silicon and silicon alloys and silicon compounds, tin and tin compounds and tin alloys, $Li_4Ti_5O_{12}$, and Silicon-C compounds. Examples of cathode materials for lithium-ion batteries include, but are not limited to, $LiNi_xCo_yAl_zO_2$, $LiNi_xMn_yCo_zO_2$, LiCoO2, $LiFePO_4$, $LiMn_2O_4$, $LiMn_2O_4$ with substitutes of aluminum, iron, zinc, cobalt, nickel, titanium, and chrome, and boron, lithium nickel manganese cobalt oxide compounds, lithium nickel cobalt aluminum compounds, transition metal dichalcogenides such as $TiS_2$, $WS_2$, and $MoS_2$ and corresponding selenides, and cathode particles with a surface coatings e.g. silver, gold, ZnO, MgO, $Al_2O_3$. Examples for electrode substrate particles for supercapacitors are, but are not limited to activated carbon, and metal oxides such as ruthenium oxides and manganese oxides. Examples for electrode substrate particles for lead acid batteries are, but are not limited to, Pb, $PbO_2$, PbSe alloy, PbCa alloy, PbSb alloy.

Figure 2A:
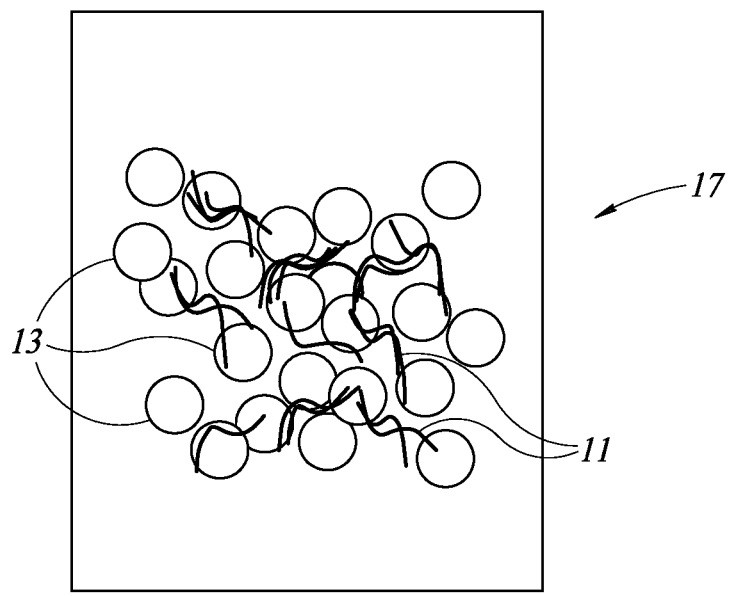
FIGS. 2A and 2B are illustrations of CNTs with electrode substrate particles in a first configuration (FIG. 2A) wherein the CNTs are aggregated together and a second configuration (FIG. 2B), after disaggregation, where the CNTs are more spread apart.
Figure 2B:
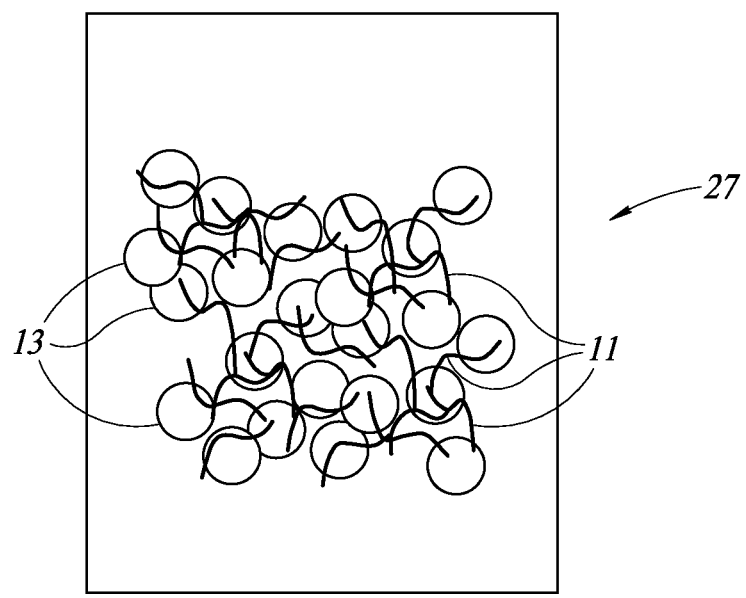

The AMT method of the invention creates physical 3-D cluster networks of carbon nanotubes with substrate particles by distancing the small scale particles from one another, and by providing a substrate matrix such that when the dispersed small scale particles come into contact with the substrate particles, the contact between them remains stable due to electrical affinity between them. In this way, spread apart 3-D cluster networks can be formed. Reference is now made to FIGS. 2A and 2B which are illustrations of CNTs 11 with electrode substrate particles 13 in a first configuration wherein the CNTs 11 are aggregated together (FIG. 2A) and a second configuration, after disaggregation, where the CNTs 11 are more spread apart (FIG. 2B). The AMT technology for the mixture and interconnection of carbon nanotubes with electrode materials is beneficial in that the process disaggregates carbon nanotubes without the use of surfactants and chemical modifications of the carbon nanotubes or/and the substrate materials. Therefore, enhanced electrode material can be produced without degradation in the electronic and mechanical properties of a supercapacitor or battery electrode, and can be done in a more economical process, that avoids safety, health and environmental problems associated with organic solvents.

In order for the treatment substance to have an effect on the physical structure of the CNTs and the substrate, the treatment substance must be at least partially in a shared physical space as the CNTs and the substrate during cavitation. The shared physical space may be, for example, an AMT vessel or portions thereof, which may include a pipe, a container, or any other suitable space. Embodiments of various vessels which can be used in the invention are presented herein. However, it should be readily apparent that the invention is not limited to the particular vessels descried herein, and any vessel which is capable of achieving the same result may be included within the scope of the invention.

Reference is now made to FIGS. 3A-3D, which are illustrations of a system 10 for treatment of small scale materials such as carbon nanotubes in accordance with embodiments of the invention. System 10 includes an AMT vessel 8, which has a treatment chamber 12, a cavitator 14, and an external treatment substance source 29 for providing a treatment substance to treatment chamber 12. An AMT vessel is defined as a vessel in which advanced material treatment can take place. Although in some embodiments, the AMT vessel may resemble a reactor vessel, the term "reactor" is not used here so as not to confuse a chemical reaction—which sometimes occurs in reactor vessels—with the AMT process. A cavitator 14 is defined as an object which induces cavitation in a treatment substance 19, and may include, for example, an object which induces ultrasound or other types of waves, mechanical agitation, or any other method which can cause cavitation within treatment substance 19. In the embodiment shown in FIGS. 3A-3D, cavitator 14 is an ultrasound probe 15. Treatment chamber 12 is configured to hold therein a mixture of CNTs 11 and electrode substrate particles 13, referred to herein as a CNT/substrate mixture 17 (as depicted, for example, in FIG. 2A). CNT/substrate mixture 17 may be, for example, a carbon nanotube dry powder with an electrode substrate as described above. In the embodiment shown herein, a treatment substance 19 such as $CO_2$ is also introduced into treatment chamber 12 as well, although in other embodiments, treatment substance 19 may be provided in different ways, such as via a different vessel. Treatment substance 19 may be mixed with CNT/substrate mixture 17. However, it is a particular feature of the invention, that the mixing of treatment substance 19 with CNT/substrate mixture 17 does not result in a chemical interaction between treatment substance 19 and the CNT/substrate mixture 17.

The dispersion (i.e. deagglomeration and disaggregation) is accomplished by effecting cavitation within treatment substance 19. CNT/substrate mixture 17 after it has undergone the AMT process described herein will be referred to as a dispersed CNT/electrode substrate matrix 27 (as depicted, for example, in FIG. 2B). The cavitation which causes formation of dispersed CNT/electrode substrate matrix 27 can be accomplished in various ways, as will be described hereinbelow. However, in many of the methods, high pressures and/or high temperatures are used, and as such, conventional reaction vessels, which are generally open on top and not capable of withstanding high pressures and/or temperatures, cannot be used.

In the embodiment shown herein, cavitation is accomplished by the use of $CO_2$ in one or multiple phases, and by application of ultrasound waves via ultrasound transducer 15. As can be seen in perspective view in FIGS. 3A and 3B, and in cross section in FIG. 3C, treatment chamber 12 includes a bottom portion 16, which is configured to receive CNT/substrate mixture 17 therein, and a top cover 18, which is configured to be positioned on top of and sealed to bottom portion 16. A cavity 20 in bottom portion 16 provides space for holding therein CNT/substrate mixture 17 and/or treatment substance 19. Cavity 20 may be, for example, a cylinder but may be other shapes as well. Access to cavity 20 is provided by a series of pipes or tubes that pass through top cover 18 and/or bottom portion 16. Ultrasound probe 15 is inserted through top cover 18 and into cavity 20 in a manner in which ultrasound waves can be applied to cavity 20 without removal of top cover 18.

Figure 3A:
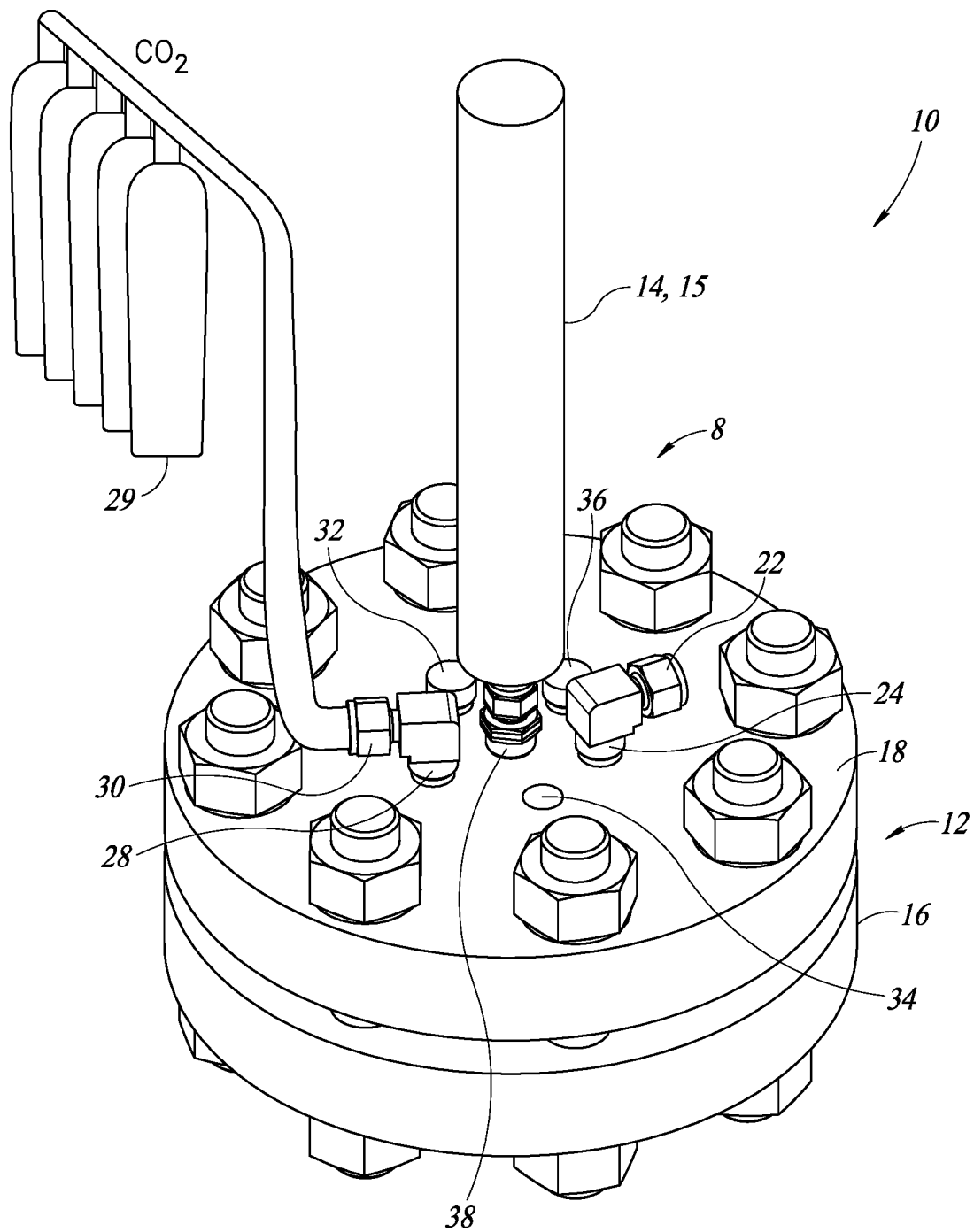
FIGS. 3A-3D are illustrations of a system for dispersion of small scale materials in accordance with embodiments of the invention.
Figure 3B:
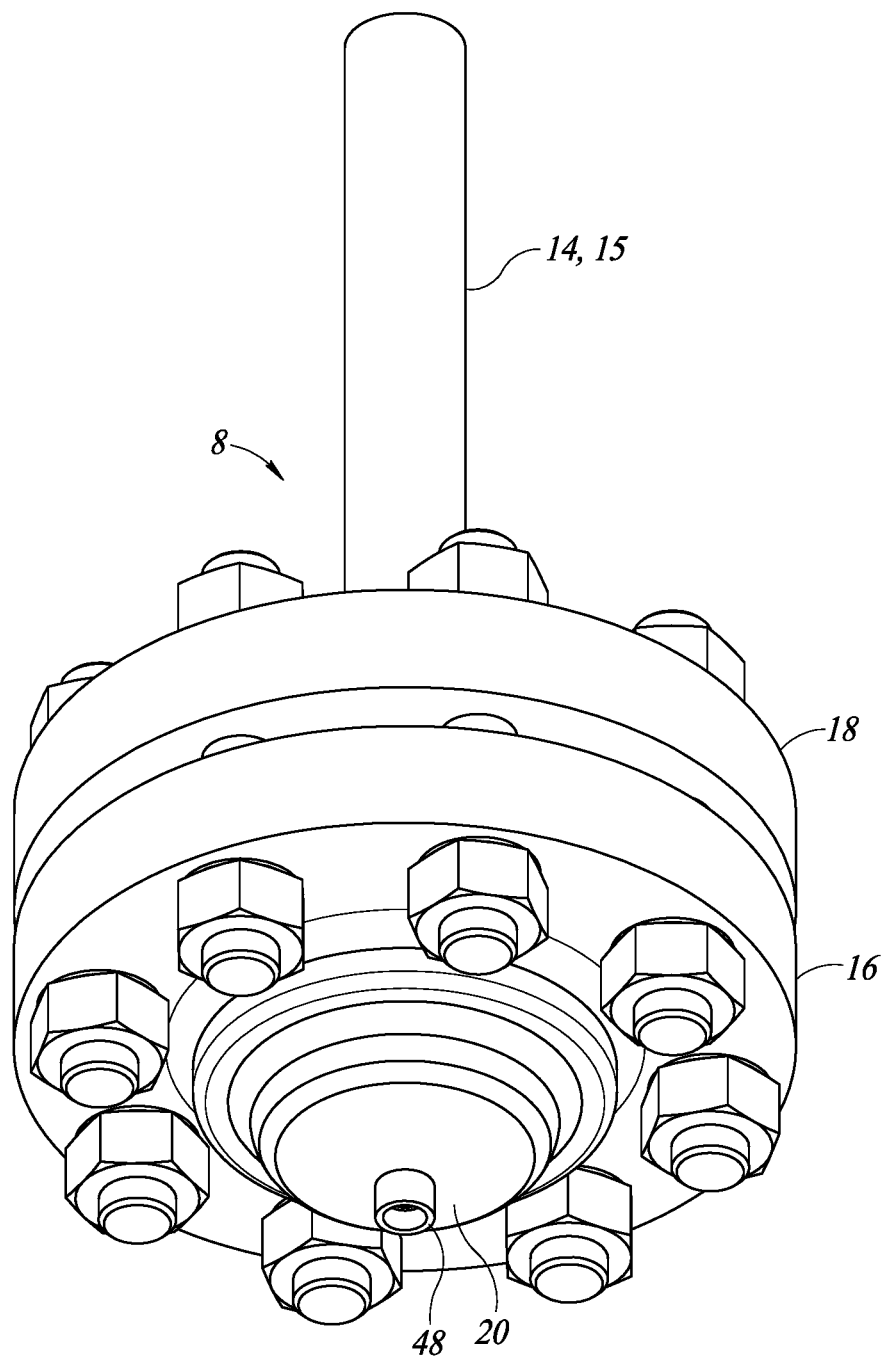
Figure 3C:
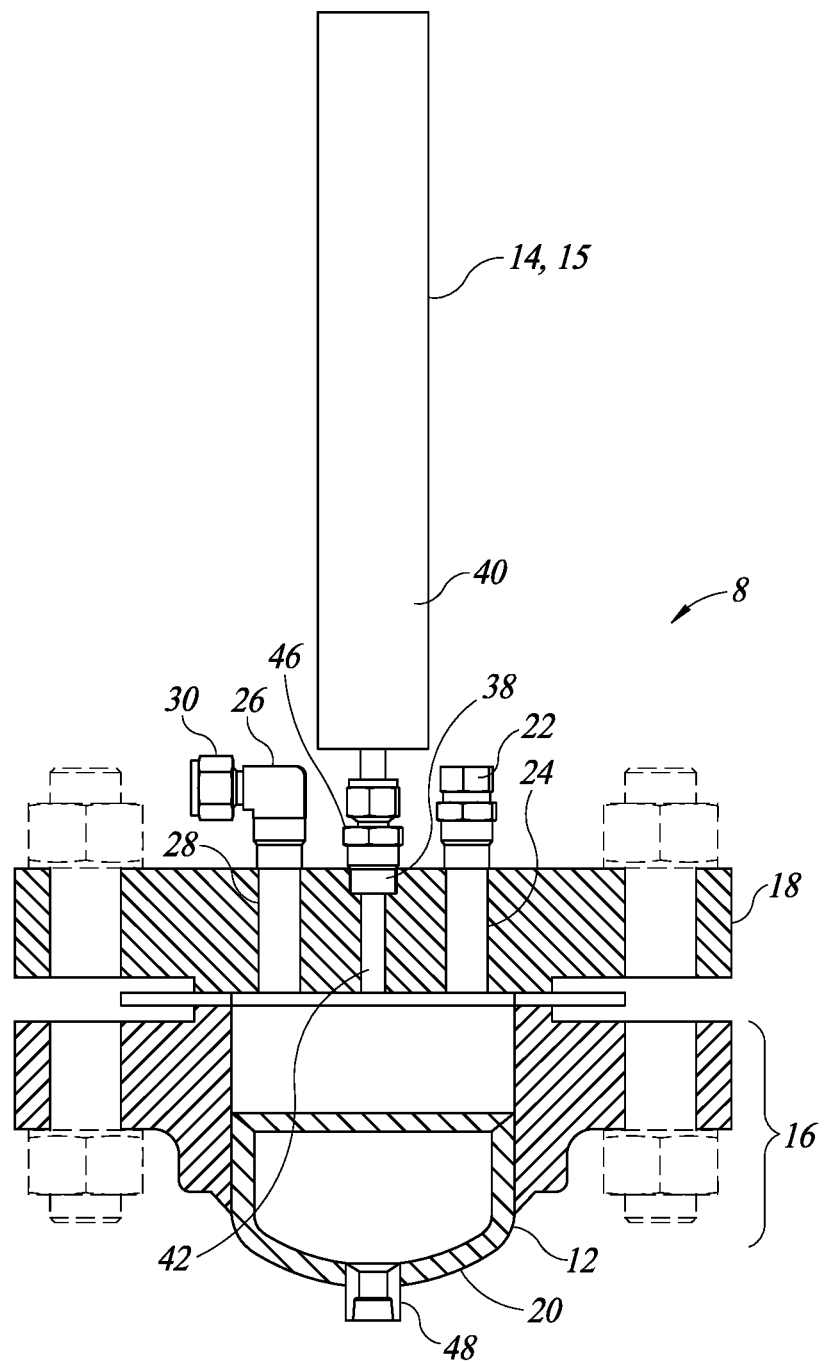
Figure 3D:
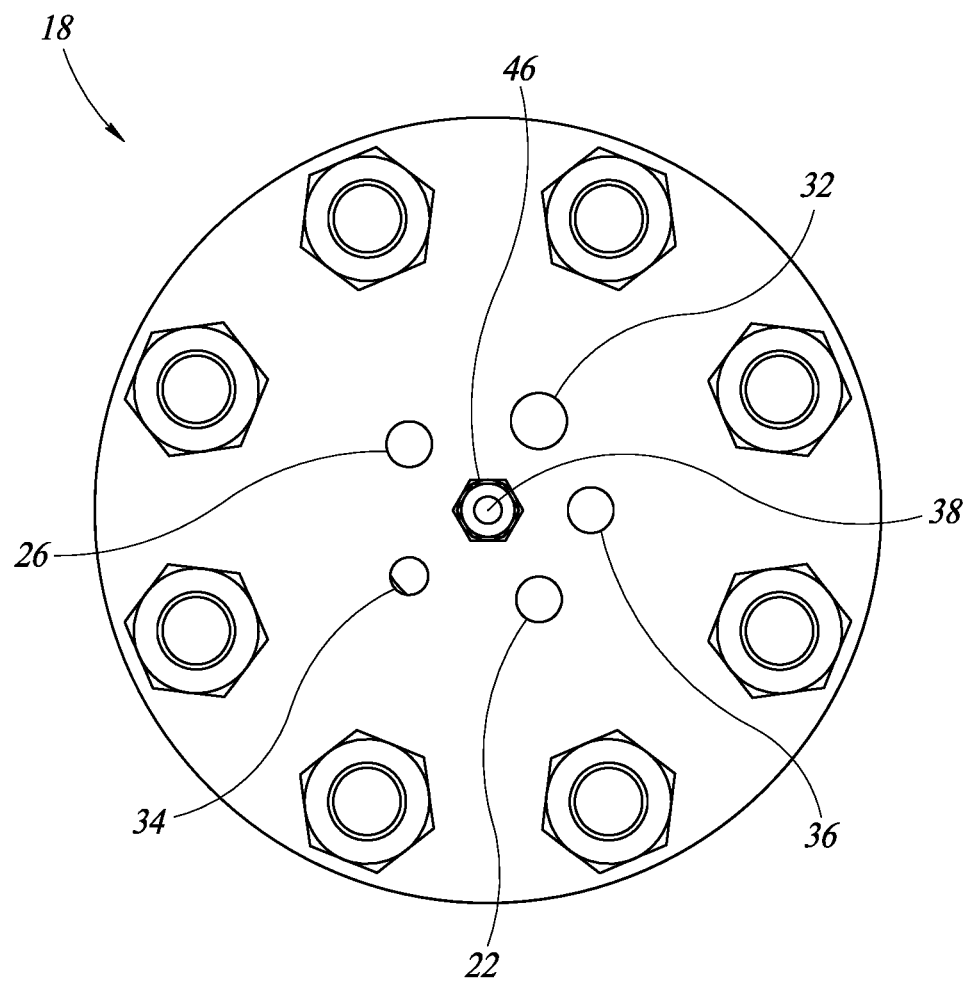

Turning now to FIG. 3D, which is a cross-section illustration of top cover 18, viewed from above, taken together with FIG. 3C, a series of ports and pipes is shown. A CNT/substrate feeding port 22 located on a top of top cover 18 is connected to a CNT/substrate feeding pipe 24. CNT/substrate feeding pipe 24 leads through top cover 18 and into cavity 20. Thus, CNT/substrate mixture 17 may be introduced into CNT/substrate feeding port 22 and through CNT/substrate feeding pipe 24 into cavity 20. CNT/substrate feeding port 22 may be a simple opening to CNT/substrate feeding pipe 24, or may include a valve, funnel, or any other type of connector suitable for introducing CNT/substrate mixture 17 through CNT/substrate feeding pipe 24 and into cavity 20. A treatment substance feeding port 26 located on a top of top cover 18 is connected to a treatment substance feeding pipe 28. Treatment substance feeding port 26 may also include a treatment substance input connector 30 for connecting treatment substance feeding pipe 28 to an external treatment substance source 29, such as a $CO_2$ gas tank, for example (shown in FIG. 3A). In any case, treatment substance feeding port 26 must be suitable for introducing treatment substance 19 through treatment substance feeding pipe 28 and into cavity 20. A removal port 48 located on bottom portion 16 is configured for removal of dispersed CNT/electrode substrate matrix 27 and/or treatment substance 19.

In addition to the feeding ports described above for introduction of the various components into treatment chamber 12, top cover 18 may further include a treatment substance outlet port 32 for removing treatment substance 19 from treatment chamber 12. For example, after the treatment process is complete, $CO_2$ may be released via treatment substance outlet port 32 into the environment or via removal port 48 into another vessel. In some embodiments a pressure measurement device is provided, and may be connected to or placed adjacent to outlet port 32, for example. Top cover 18 may also include a relief valve 34 for relieving high pressure from treatment chamber 12. In some embodiments, a thermowell 36 may be provided in top cover 18, wherein thermowell 36 may house therein a temperature measurement device, such as a sensor, for measuring a temperature inside treatment chamber 12. Top cover 18 further includes a probe insert 38 through which at least a portion of ultrasound probe 15 may be inserted into cavity 20.

Figure 4A:
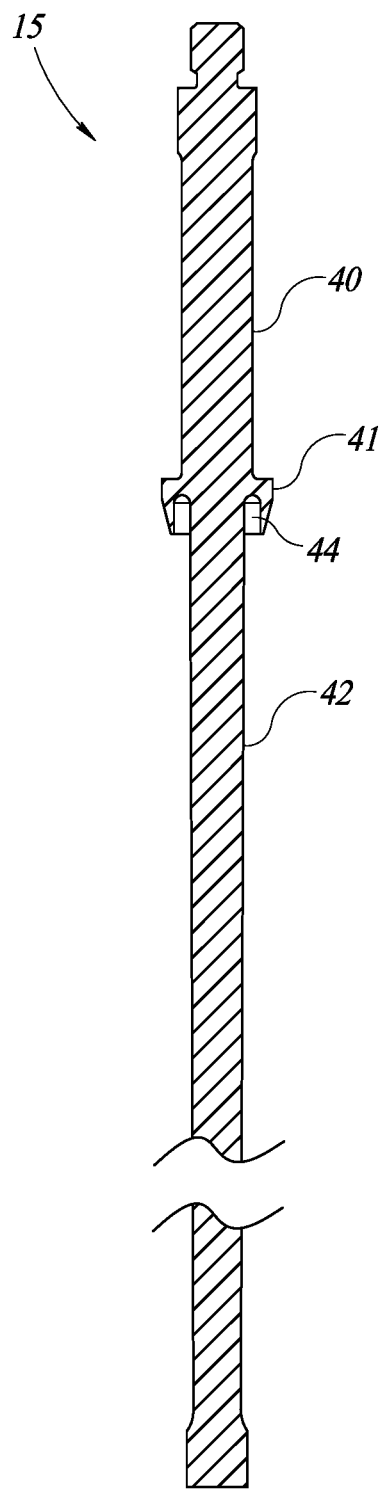
FIGS. 4A and 4B are cross-section and perspective illustrations, respectively, of an ultrasound probe of the system of FIGS. 3A-3D, in accordance with embodiments of the invention.
Figure 4B:
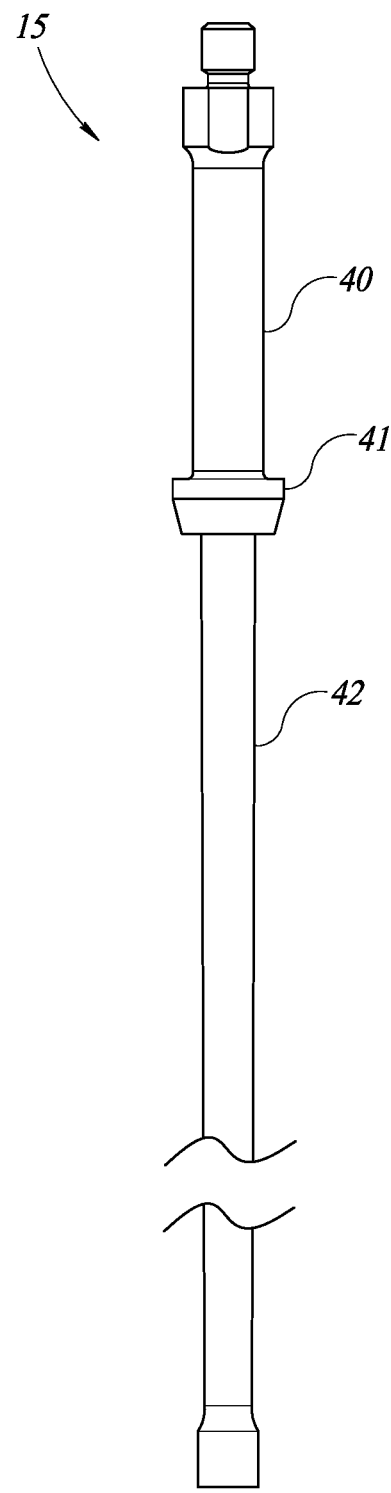

Reference is now made to FIGS. 4A and 4B, which are cross-section and perspective illustrations of ultrasound probe 15, in accordance with embodiments of the invention.

Ultrasound probe 15 is designed to be controlled from outside of treatment chamber 12 but to provide ultrasound waves in cavity 20, while top cover 18 is sealed. As such, ultrasound probe 15 includes an external probe portion 40 and an insertable probe portion 42, wherein generally external probe portion 40 is on a top and insertable probe portion 42 is on a bottom of ultrasound transducer 15. In some embodiments, insertable probe portion 42 is a tip of ultrasound transducer 15. In some embodiments, the length of external probe portion 40 is smaller than the length of insertable probe portion 42. In some embodiments, insertable probe portion 42 is narrower than external probe portion 40. External probe portion 40 and insertable probe portion 42 meet at a cover connecting portion 41 of ultrasound probe 15. Cover connecting portion 41 is a portion of ultrasound probe 15 which connects to top cover 18. Cover connecting portion 41 may include a probe locking mechanism 44, which is designed to lock into a portion of top cover 18 at probe insert 38. In some embodiments, a cover locking mechanism 46 is provided on top cover 38, wherein cover locking mechanism 46 and probe locking mechanism 44 work together to lock ultrasound probe 15 into top cover 38. An example of probe locking mechanism 44 and cover locking mechanism 46 is a male/female connector, of which there are many types (such as available from Swagelok Company, for example). In any case, probe locking mechanism 44 and cover locking mechanism 46 must provide a strong lock between top cover 18 and probe 14 so that high pressures present within treatment chamber 12 can be maintained therein while top cover 18 remains in place. It should be readily apparent that similar designs may be used for other types of probes.

Figure 5A:
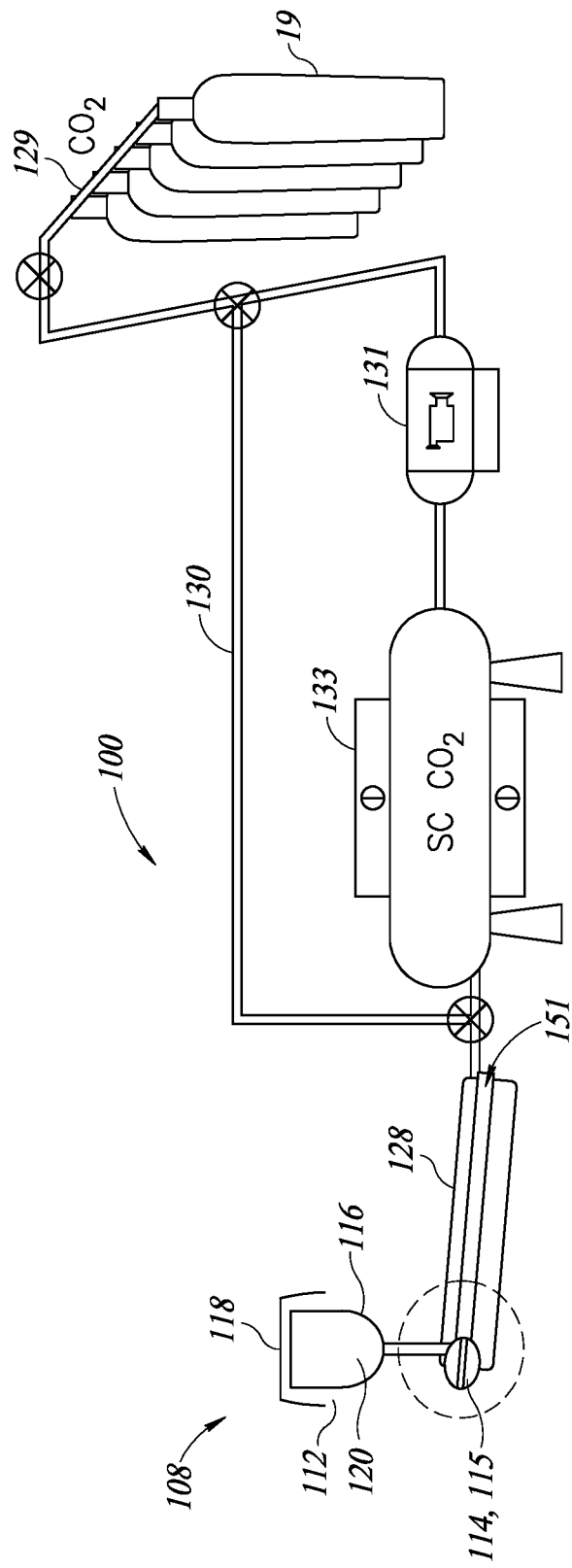
FIGS. 5A and 5B are schematic illustrations of a system for dispersion of small scale materials in accordance with additional embodiments of the invention.
Figure 5B:
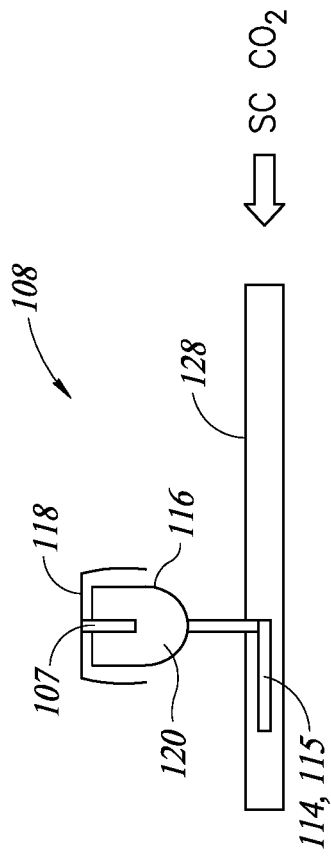

Reference is now made to FIGS. 5A and 5B, which are schematic illustrations of a system 100 for treatment of nanotubes in accordance with additional embodiments of the invention. System 100 includes an AMT vessel 108, having a treatment chamber 112 and a cavitator 114, and an external treatment substance source 129. Treatment chamber 112 is configured to hold therein CNT/substrate mixture 17, as well as treatment substance 19. Cavitator 114 in the embodiment shown in FIGS. 5A and 5B is an injector 115, which is configured for providing a high speed flow of $scCO_2$ into treatment chamber 112. Treatment chamber 112 includes a bottom portion 116, which has a cavity 120 therein for receiving of CNT/substrate mixture 17 and treatment substance 19, and further includes a top cover 118, which is configured to be positioned on top of and sealed to bottom portion 116. Access to cavity 120 is provided by at least one treatment substance feeding pipe 128. In the embodiment shown in FIG. 5B, treatment chamber 112 further includes a holding chamber 107 for holding CNT/substrate mixture 17 and $scCO_2$ therein.

External treatment substance source 129 may be, for example, a tank such as a $CO_2$ gas tank or series of gas tanks which holds treatment substance 19 therein. External treatment substance source 129 may be equipped with a syphon to provide $CO_2$ in its liquid phase. Treatment substance 19 may flow in liquid phase from external treatment substance source 129, through treatment substance transport pipe 130 into treatment substance feeding pipe 128. Treatment substance 19 is introduced in its liquid phase from treatment substance feeding pipe 128 into cavity 120. Alternatively, treatment substance 19 may flow from external treatment substance source 129, through a compressor 131 and/or a heating unit 133 into treatment substance feeding pipe 128. From there, treatment substance 19 is introduced in its supercritical phase ($scCO_2$) into AMT vessel 108 in accordance with the various embodiments described herein.

Treatment chamber 112 may be any vessel suitable for holding CNT/substrate mixture 17 therein, and must be configured to withstand high pressures. In some embodiments, treatment chamber 112 is capable of withstanding pressures of up to 70 bar. In other embodiments, treatment chamber 112 is capable of withstanding pressures of up to 120 bar. In other embodiments, treatment chamber 112 is capable of withstanding pressures of up to 200 bar. In embodiments of the invention, treatment vessel may be comprised of a metal, such as stainless steel, and may have a wall thickness of at least 5 mm and in some embodiments of at least 7 mm.

The dispersion is accomplished by effecting cavitation within treatment substance 19. This cavitation can be accomplished in various ways, as will be described hereinbelow. However, in many of the methods, high pressures and/or high temperatures are used, and as such, conventional reaction vessels, which are generally open on top and not capable of withstanding high pressures and/or temperatures, cannot be used.

In the embodiment shown in FIG. 5A, cavitation is accomplished by the use of an injected jet stream of supercritical $CO_2$ into treatment chamber 112, wherein treatment chamber 112 has CNT/substrate mixture 17 and liquid $CO_2$ therein. The $scCO_2$ is introduced via treatment substance feeding pipe 128 through injector 115 into treatment chamber 112 as a high speed jet stream. In embodiments of the invention, the speed of the jet stream is in a range of 20-40 m/sec. The high speed injection of supercritical $CO_2$ causes cavitation in the supercritical $CO_2$, which then interacts with CNT/substrate mixture 17, causing disaggregation of CNTs.

An alternative embodiment is shown in FIG. 5B, in which injector 115 serving as cavitator 114 is installed on treatment substance feeding pipe 128. In this embodiment, supercritical $CO_2$ is introduced into injector 114 via treatment substance feeding pipe 128. CNT/substrate mixture 17 and $scCO_2$ or liquid $CO_2$ are placed in holding chamber 107. Injector 114 carries $scCO_2$ at a high speed, which causes a pressure drop in injector 114. A pressure gradient thus forms between holding chamber 107 and injector 115, and a one-way valve may be positioned between holding chamber 107 and injector 115. This causes the $scCO_2$ or liquid $CO_2$ and CNT/substrate mixture 17 to flow from holding chamber 107 into injector 115. Cavitation occurs due to the movement of CNT/substrate mixture 17 with $scCO_2$ into injector 115.

Figure 6A:
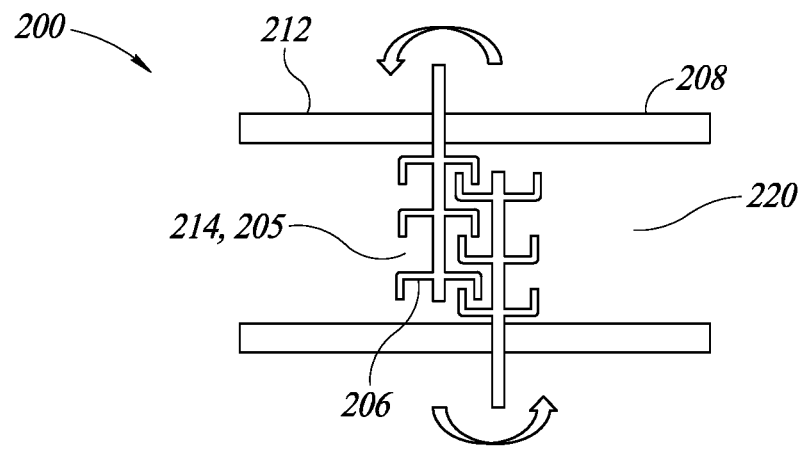
FIGS. 6A-6C are illustrations of a system for dispersion of small scale materials in accordance with yet additional embodiments of the invention.
Figure 6B:
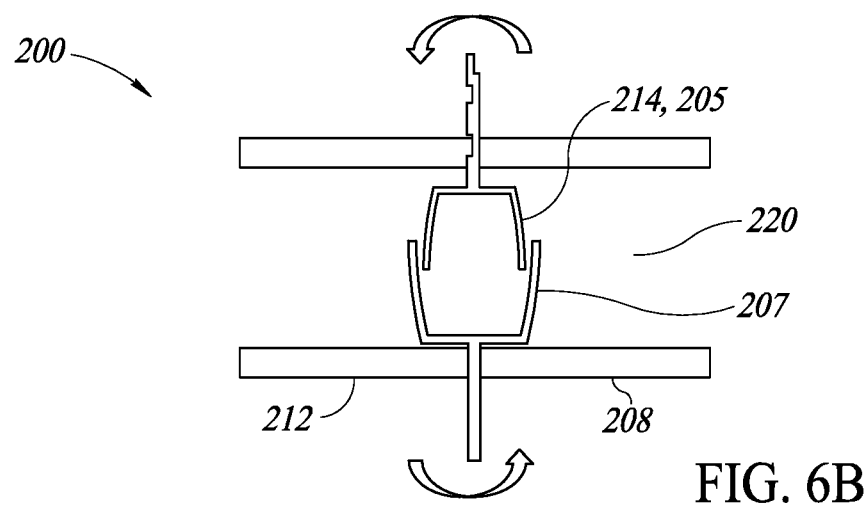
Figure 6C:
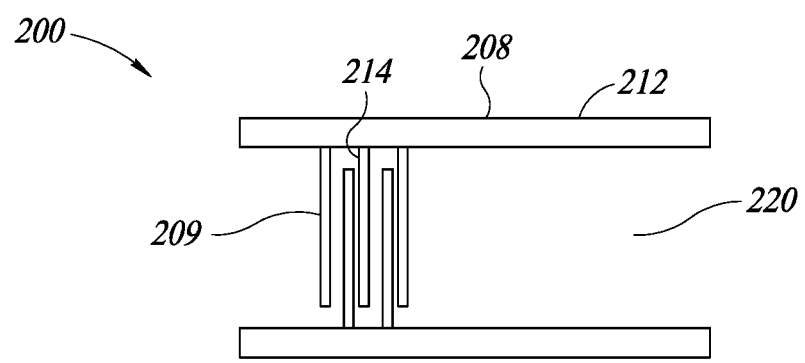

Reference is now made to FIGS. 6A-6C, which are illustrations of a system 200 in accordance with additional embodiments of the invention. In the embodiment shown herein, AMT vessel 208 is a pipe AMT vessel having a treatment chamber 212 and a cavitator 214. Treatment chamber 212 comprises a cavity 220 formed by the walls of the pipe AMT vessel 208. In the embodiment shown in FIGS. 6A and 6B, cavitator 214 is a mechanical agitator 205, which may be comprised of, for example, rotating blades 206 as shown in FIG. 6A, or rotating cups 207, as shown in FIG. 6B. Mechanical agitator 205 is positioned within treatment chamber 212. Rotating blades 206 may include two sets of blades configured to rotate in opposite directions. The rotation occurs at high speeds (e.g. 10,000-40,000 revolutions per minute). Rotating cups 207 may include two sets of cup-shaped objects, wherein an opening of the cup is facing downward for the first cup-shaped object and facing upward for the second cup-shaped object. Rotating cups are configured to rotate in opposite directions and are configured to rotate at high speed (e.g. 10,000-40,000 revolutions per minute). The cups may also include openings therein, which interrupts the flow and causes fluid droplets to be formed. CNT/substrate mixture 17 is placed within pipe AMT vessel 208. Supercritical $CO_2$ is introduced into pipe AMT vessel 208, and is configured to flow therethrough. While supercritical $CO_2$ is flowing through cavity 220, mechanical agitator 205 is activated, thereby causing cavitation in the supercritical $CO_2$.

In another embodiment, shown in FIG. 6C, cavitator 214 is a plate assembly 209. Plate assembly 209 is formed from multiple parallel plates, wherein alternatingly a top or a bottom of the plate is connected to an internal wall of AMT treatment vessel 208, and spacing between adjacent plates follows a pattern of wide spacing followed by narrow spacing followed by wide spacing, etc. Thus, treatment substance 19 flows through plate assembly 209 and undergoes a sequence of sharp pressure peaks and drops generated by the wide and narrow gaps between the plates. These pressure peaks and drops cause cavitation in treatment substance 19.

Figure 7:
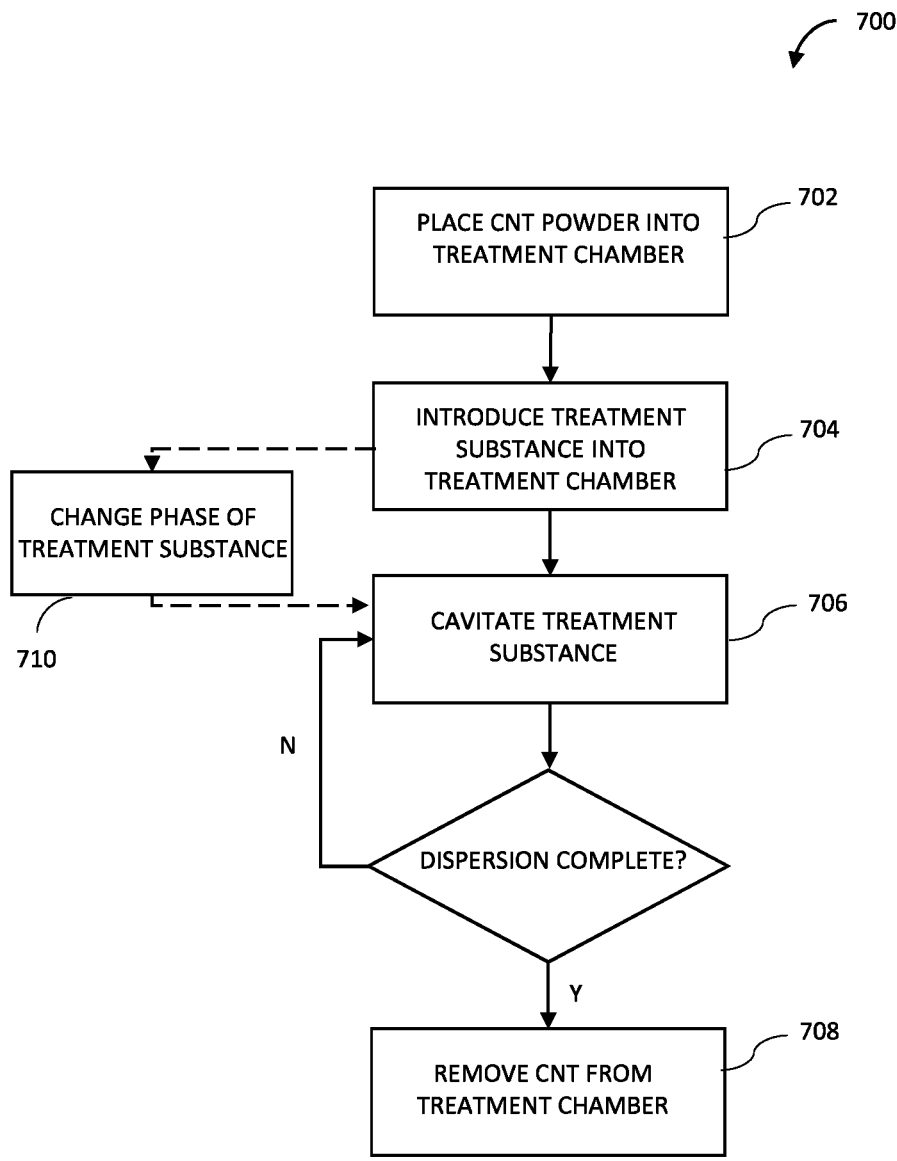
FIG. 7 is a flow-chart diagram illustration of a method for dispersion of carbon nanotubes, in accordance with embodiments of the invention.

Reference is now made to FIG. 7, which is a flow-chart illustration of a method 700 for dispersion of small scale materials, in accordance with embodiments of the invention. First, the small scale material, such as a dry carbon nanotube powder is placed into a treatment chamber (step 702). The dry carbon nanotube powder may also be combined with an electrode substrate material. A treatment substance, which is capable of undergoing phase changes and is also capable of undergoing cavitation is introduced (step 704) into the treatment chamber, either directly or indirectly. The treatment substance is then cavitated (step 706), which may be done in various ways, and can either be done simultaneous to the step of introducing the treatment substance into the treatment chamber, or may be done subsequent to the step of introducing the treatment substance into the treatment chamber. This creates a dispersed CNT/electrode substrate matrix 27. If dispersion is complete, the dispersed CNT/electrode substrate matrix 27 is removed (step 708) from the treatment chamber. Removal may be done without treating dispersed CNT/electrode substrate matrix 27 with surfactants or other chemical methods. If dispersion is not complete, or if the user wishes to separate the CNTs even more, the step of cavitating the treatment substance (step 706) may be repeated. This repeating may be done in pulses, or continuously over time. In some embodiments, the phase of the treatment substance may be altered (step 710) either before or during the step of cavitation. This altering may in some embodiments be reversed during the method. More specific embodiments of this method are now described.

Filling of the Treatment Chamber with CNT/Substrate Material

The dry carbon nanotube powder alone or together with the substrate particles in predetermined weight ratio are loaded into a treatment chamber 12. Cavity 20, 120, 220 of system 10, 100, 200 is designed to hold high pressures, up to and including 200 bar. The ratio of CNT 11 to electrode substrate particles 13 can be of any ratio, preferably from 0.01% to 10% mass with respect to the substrate particle. The volume of CNT/substrate mixture 17 which is loaded into treatment chamber 12, 112, 212 may be in a range from 0.1 to 80% volume of cavity 20, 120, 220, preferably in a range of 1.0-40% volume. In system 10 CNT/substrate mixture 17 is either placed directly into cavity 20 before top cover 18 is placed thereon, or may be introduced into cavity 20 via CNT/substrate feeding port 22 and through CNT/substrate feeding pipe 24. In systems 100 and 200, CNT/substrate mixture 17 is placed directly into cavity 120, 220.

In embodiments of the invention, the AMT method described herein is configured to operate at varying pressures. In embodiments of the invention, the working pressure is in a range of 1 to 500 bar. In some embodiments, the working pressure is in a range of 1-100 bar. In embodiments of the invention, the working temperature is in a range of −60 to 60° C., and in some embodiments is in a range of 0 to 40° C.

Filling the Treatment Chamber with $CO_2$

Cavity 20, 120, 220 is filled treatment substance 19, which, in embodiments of the invention, is a non-interacting and/or non-reactive substance (i.e. causes no chemical changes to CNT/substrate material). For example, $CO_2$ in solid, liquid, gaseous or supercritical form may be used. The particular phase of the treatment substance can be controlled by adjusting the pressure and temperature. For example, if $CO_2$ is used, the phase is adjusted via parameters shown in FIG. 1. The pressure is controlled by the amount of treatment substance 19 which is allowed into cavity 20, 120, 220. For system 10, using the example of $CO_2$ as treatment substance 19, treatment substance 19 is introduced into cavity 20 via treatment substance feeding port 26 and through treatment substance feeding pipe 28. Treatment substance feeding port 26 may be connected to an external treatment source 29, which may be, for example, a reservoir or tank holding treatment substance therein. For systems 100, using the example of $CO_2$ as treatment substance 19, treatment substance 19 is introduced into cavity 120 from external treatment source 129 via treatment substance feeding pipe 128 and through injector 115. Similarly, for system 200, using the example of $CO_2$ as treatment substance 19, treatment substance 19 is introduced into cavity 220 from an external treatment source into cavity 220. In both systems 100 and 200, treatment substance 19 may also be sent through a compressor 131 and/or a heating unit 133 as depicted in FIG. 5A. Moreover, in all embodiments, the pressure and temperature may be controlled and monitored. For example, the pressure may be controlled by using a compressor 131 as shown in FIG. 5A. Any standard compressor, such as, for example, a high pressure plunger pump (DPX100 series manufactured by Wepuko Pahnke) may be used. The working temperature may be adjusted by an external heating and cooling system such as heating unit 133 shown in FIG. 5A. Heating unit 133 may be any standard heating unit (for example product 4622HP manufactured by Parr Instrument). It should be readily apparent that although such pressure and temperature control units are depicted in FIG. 5A, similar units may be used in any of the embodiments described herein. Moreover, a temperature measurement device (for example Type-101 manufactured by Manoraz) and a pressure measurement device (for example, MAN-SF manufactured by Manoraz), such as a sensor, may be used to determine a temperature and/or pressure inside treatment chamber 12, 112, 212.

Operation of System 10

The following embodiments are some examples of methods of providing dispersed CNTs using a treatment substance whose phase may be varied. At least one, and at most four phase transitions of the treatment substance (in the embodiments described herein $CO_2$ is used as the example) occur during the method. The CNTs, as well as the electrode material always remain solid, regardless of the operation mode used.

Embodiment 1: Using any of Systems 10, 100, or 200 or any Other Suitable System CNT/substrate mixture 17 is introduced into cavity 20, 120, 220 at atmospheric pressure and room temperature (RT). Cavity 20, 120, 220 is then filled with $CO_2$, liquid, solid or gaseous until a pressure in a range of 5 to 70 bar is reached. Subsequently the temperature is increased to a working temperature which may be any temperature in a range of RT–200° C., preferably in a range of 25–45° C. The $CO_2$ is in gaseous phase, freely diffusing between the CNTs and substrate particles. Spontaneous or fast evacuation of the system to pressures between 1-20 bar, preferably between 1-10 bar, leads to disaggregation and deagglomeration of the CNTs and the electrode substrate materials. The evacuation may be done by removing $CO_2$ via treatment substance outlet port 32, for example.

Embodiment 2: Using any of Systems 10, 100, or 200 or any Other Suitable System CNT/substrate mixture 17 is introduced into cavity 20, 120, 220 at atmospheric pressure and room temperature (RT). Cavity 20, 120, 220 is then filled with $CO_2$, liquid, solid or gaseous until a pressure in the range of 5 to 70 bar is reached (High Process Pressure). Subsequently the temperature is increased to a working temperature which may be any temperature in a range of RT–200° C., preferably in a range of 25-45° C. The $CO_2$ is in gaseous phase, freely diffusing between the CNTs and particles. Fast partial evacuation (via, for example, treatment substance outlet port 32) of the system (Partial Evacuation) reduces pressure in AMT reactor below High Process Pressure with a pressure drop of between 1-60 bar, preferably between 10-30 bar, which leads to disaggregation and deagglomeration of the CNTs and the electrode substrate materials.

Cavity 20, 120, 220 is then refilled with $CO_2$, liquid, solid or gaseous until High Process Pressure is reached (Cavity Refill). Subsequently the temperature is increased to a working temperature which may be any temperature in a range of RT–200° C., preferably in a range of 25-45° C. Partial Evacuation is applied followed by Cavity Refill. The sequence of Partial Evacuation with Cavity Refill constitutes a single (Pressure Shift) cycle. The number of Pressure Shift cycles may be between 1 and 1000, preferably between 5 and 25.

Embodiment 3: Using System 10 or any Suitable System

CNT/substrate mixture 17 is introduced into cavity 20 at atmospheric pressure and room temperature (RT). Cavity 20 is filled at any temperature, preferably between 20-50° C. with $CO_2$, liquid, solid or gaseous until a pressure in the range of 5 to 100 bar is reached. The temperature during operation is in a range of −56 to 30° C. This operating temperature and pressure results in liquid $CO_2$. Once cavity 20 is filled with liquid $CO_2$, CNT or CNT/substrate and the system is in equilibrium, ultrasonication is applied to achieve disaggreagtion and deagglomeration of CNT bundles and electrode materials. Ultrasonication is operated continuous or pulsed for intervals between 1 second to 6 hours. Ultrasonication power is applied from 1 w to 10 kw, preferably from 100 w to 200 w. After completion of ultrasonication process, $CO_2$ is removed via treatment substance outlet port 32, and dispersed CNT/electrode substrate matrix 27 is removed from cavity 20 via removal port 48.

Embodiment 4: Using System 10 or any Suitable System

CNT/substrate mixture 17 is introduced into cavity 20 at atmospheric pressure and room temperature (RT). Cavity 20 is filled at any temperature, preferably between 20-50° C. with $CO_2$, liquid, solid or gaseous until a pressure in the range of 74 to 200 bar is reached. The temperature during operation is in a range of 32 to 45° C. This operating temperature and pressure results in supercritical $CO_2$. Once the reactor is filled with liquid $CO_2$, CNT, or CNT with electrode materials and the system is in equilibrium, ultrasonication is applied to achieve disaggreagtion and deagglomeration of CNT bundles and electrode materials. Ultrasonication is operated continuous or pulsed for intervals between 1 second to 6 hours. Ultrasonication power is applied from 1 w to 10 kw, preferably from 100 w to 200 w. After completion of ultrasonication process, $CO_2$ is removed via treatment substance outlet port 32 and dispersed CNT/electrode substrate matrix 27 is removed from cavity 20 via removal port 48.

Embodiment 5: Using System 10 or any Suitable System

CNT/substrate mixture 17 is introduced into cavity 20 at atmospheric pressure and room temperature (RT). Cavity 20 is filled at any temperature, preferably between 20-50° C. with $CO_2$, liquid, solid or gaseous until a pressure in the range of 74 to 200 bar is reached. The temperature during operation is in a range of 25 to 30° C. This operating temperature and pressure results in liquid $CO_2$. Once the reactor is filled with liquid $CO_2$, CNT, or CNT with electrode materials and the system is in equilibrium, ultrasonication is applied to achieve disaggregation and deagglomeration of CNT bundles and electrode materials. Ultrasonication is operated in pulses of 1 second to 60 seconds, which increases the temperature of the system during each pulse. This increase in temperature leads to a phase transition from liquid $CO_2$ to $scCO_2$ during each ultrasound pulse. After each ultrasound pulse, the phase returns to liquid $CO_2$. The shift from liquid-$scCO_2$ increases the diffusion of $CO_2$ in the system. Ultrasonication power is applied from 1 w to 10 kw, preferably from 100 w to 200 w. After completion of ultrasonication process, $CO_2$ is removed via treatment substance outlet port 32 and dispersed CNT/electrode substrate matrix 27 is removed from cavity 20 via removal port 48.

Embodiment 6: Using System 10 or any Suitable System

CNT/substrate mixture 17 is introduced into cavity 20 at atmospheric pressure and room temperature (RT). Cavity 20 is filled at any temperature, preferably between 20-50° C. with $CO_2$, liquid, solid or gaseous until a pressure in the range of 74 to 200 bar is reached. The temperature during operation is in a range of 25 to 30° C. This operating temperature and pressure results in equilibrium between liquid $CO_2$ and gas $CO_2$. Once the reactor is filled with liquid $CO_2$ or gas $CO_2$, CNT, or CNT with electrode materials and the system is in equilibrium between liquid $CO_2$ and gas $CO_2$, external heating is applied to treatment chamber 12, which increases the temperature of the system above 32 degrees Celsius. This increase in temperature leads to a phase transition from liquid $CO_2$ and gas $CO_2$ to $scCO_2$. After the system stabilizes as $scCO_2$, external cooling is applied to treatment chamber 12, reducing system temperature to below 30 degrees Celsius. This decrease in temperature returns the phase to liquid-gas $CO_2$ equilibrium. The above system temperature increase, followed by a temperature decrease with shift from liquid/gas to $scCO_2$ and reverse shift to liquid/gas $CO_2$ constitutes a single reversible phase transition pulse. The shift between liquid/gas equilibrium and $scCO_2$ increases the diffusion of $CO_2$ in the system, which achieves disaggregation and deagglomeration of CNT bundles and electrode materials. The sequence of external heating by external cooling constitutes a single cycle of reversible phase transition. The number of cycles of reversible phase transition may be between 1 and 1000 and preferably between 5 and 25 cycles. After completion of the temperature increase/decrease process, $CO_2$ is removed via treatment substance outlet port 32, and dispersed CNT/electrode substrate matrix 27 is removed from cavity 20 via removal port 48.

Operation of System 100

The following embodiments are some examples of methods of providing disaggregated CNTs. At least one, and at most four phase transitions of the treatment substance (in the embodiments described herein $CO_2$ is used as the example) occur during the method. However, only supercritical $CO_2$ is used in the jet stream. The CNTs, as well as the electrode material always remain solid, regardless of the operation mode used.

Embodiment 7: Using System 100 or any Suitable System

CNT/substrate mixture 17 is introduced into cavity 120 at atmospheric pressure and room temperature (RT). Cavity 120 is also filled at any temperature, preferably between 20-50° C. with $CO_2$, liquid, solid or gaseous until a pressure in the range of 5 to 100 bar is reached. The temperature during operation is in a range of −56 to 30° C. This operating temperature and pressure results in liquid $CO_2$. Once the reactor is filled with liquid $CO_2$, $scCO_2$ is injected into treatment chamber 12 via injector 115. This injection may be done continuously or in pulses at intervals of between 1 second to 6 hours.

Embodiment 8: Using System 100 or any Suitable System

CNT/substrate mixture 17 is introduced into holding chamber 107 at atmospheric pressure and room temperature (RT). Holding chamber 107 is also filled at any temperature, preferably between 20-50° C. with $CO_2$, liquid, solid or gaseous until a pressure in the range of 74 to 200 bar is reached. The temperature during operation is in a range of 32 to 45° C. This operating temperature and pressure results in supercritical $CO_2$. Once the reactor is filled with liquid $CO_2$, CNT, or CNT with electrode materials and the system is in equilibrium, additional $scCO_2$ is introduced via treatment feeding pipe 128 into injector 115. The $scCO_2$ which is in in holding chamber 107 gets sucked into injector 115 by a pressure gradient, carrying CNT/substrate mixture 17 with it. This $scCO_2$ flow through injector 115 generates cavitation inside $scCO_2$ to achieve disaggreagtion and deagglomeration of CNT bundles and electrode materials.

Operation of System 200

The following embodiments are some examples of methods of providing disaggregated CNTs. In these embodiments, only supercritical $CO_2$ is used in the jet stream. The CNTs, as well as the electrode material always remain solid, regardless of the operation mode used.

Embodiment 9: Using System 200 or any Suitable System

CNT/substrate mixture 17 is introduced into cavity 220 at atmospheric pressure and room temperature (RT). Treatment chamber 212 may include multiple sections connected by pipes, wherein the connections may be a circular shape or straight shape. In some embodiments, treatment chamber 212 itself has a pipe shape. Cavity 220 is filled at any temperature, preferably between 20-50° C. with $CO_2$, liquid, solid or gaseous until a pressure in the range of 74 to 200 bar is reached. The temperature during operation is in a range of 32 to 45° C. This operating temperature and pressure results in supercritical $CO_2$. Once the treatment chamber 212 is filled with $scCO_2$, CNT, or CNT with electrode materials and the system is in equilibrium, a mechanical agitator 205 such as, for example, rotating blades 206 or rotating cups 207 is activated, generating cavitation inside the $scCO_2$ to achieve disaggreagtion and deagglomeration of CNT bundles and electrode materials. Mechanical agitator 205 may be operated in continuous or pulsed intervals between 1 second and 6 hours.

Embodiment 10: Using System 200 or any Suitable System

CNT/substrate mixture 17 is introduced into cavity 220 at atmospheric pressure and room temperature (RT). Treatment chamber 212 may include multiple sections connected by pipes, wherein the connections may be a circular shape or straight shape. In some embodiments, treatment chamber 212 itself has a pipe shape. Cavity 220 is filled at any temperature, preferably between 20-50° C. with $CO_2$, liquid, solid or gaseous until a pressure in the range of 74 to 200 bar is reached. The temperature during operation is in a range of 32 to 45° C. This operating temperature and pressure results in supercritical $CO_2$. Once the reactor is filled with $scCO_2$, CNT, or CNT with electrode materials and the system is in equilibrium, $scCO_2$ is moved through plate assembly 209, carrying dry electrode material while flowing through gaps between the plates of plate assembly 209, generating cavitation inside $scCO_2$ to achieve disaggreagtion and deagglomeration of CNT bundles and electrode materials. $scCO_2$ is operated in continuous or pulsed for intervals between 1 s to 6 h.

Embodiment 11: Using System 200 or any Suitable System

CNT/substrate mixture 17 is introduced into cavity 220 at atmospheric pressure and room temperature (RT). Treatment chamber 212 is filled at any temperature, preferably between 20-50° C. with $CO_2$, liquid, solid or gaseous until a pressure in the range of 5 to 100 bar is reached. The temperature during operation is in a range of −56 to 30° C. This operating temperature and pressure results in liquid $CO_2$. Treatment chamber 212 may include multiple sections connected by pipes, wherein the connections may be a circular shape or straight shape. In some embodiments, treatment chamber 212 itself has a pipe shape. Injectors 115 are installed at outlets of treatment chamber sections or inside pipe sections of treatment chamber. Each injector 115 is connected to treatment chamber 212 by treatment feeding pipes 128, for example. Treatment chamber 212 is filled at any temperature, preferably between 20-50° C. with $CO_2$, liquid, solid or gaseous until a pressure in the range of 74 to 200 bar is reached. The temperature during operation is in a range of 32 to 45° C. The operating temperature and pressure result in supercritical $CO_2$. Once the $scCO_2$ phase in treatment chamber 212 is achieved, and the system is in equilibrium, additional $scCO_2$ is sent through injectors 115 into cavity 220 at high speeds, generating cavitation inside $scCO_2$ to achieve disaggreagtion and deagglomeration of CNT bundles and electrode materials. $scCO_2$ is operated continuous or pulsed for intervals between 1 s to 6 h.

In addition, in some of the embodiments, orifices or other flow-interrupting parts may be included within treatment chamber 12, 112, 212, which can further enhance cavitation effects on treatment substance 19 by breaking up flow of treatment substance 19 during the AMT process.

Ventilation of Treatment Chamber 12, 112, 212

In one embodiment of the invention, $CO_2$ together with dispersed CNT/electrode substrate matrix 27 is released from AMT vessel 8 into an intermediate pressure vessel via port 48. A volume ratio between the intermediate pressure vessel and AMT vessel 8 is between 2 and 100 preferably between 5 and 20. $CO_2$ pressure level in the intermediate pressure vessel is relative to pressure in AMT vessel 8 and to the volume ratio between the intermediate pressure vessel and AMT vessel 8. Following filling of the intermediate pressure vessel, $CO_2$ is released into atmosphere resulting in atmospheric pressure inside intermediate vessel. Following release of $CO_2$ from intermediate vessel dispersed CNT/electrode substrate matrix 27 is removed from intermediate vessel.

In another embodiment, treatment substance 19 carrying dispersed CNT/electrode substrate matrix 27 is directly sprayed via port 48 onto an external substrate.

In yet another embodiment, the $CO_2$ inside AMT vessel 8 is transferred to the solid state by decreasing the temperature between −56 to −100° C., preferably to a range of −56 to −65° C. The material is extracted from the reactor as dispersed CNT/electrode substrate matrix 27 and dry ice.

EXAMPLES

A CNT/substrate mixture prepared in accordance with embodiments of the invention (referred to herein as AMT treated electrode material) was used to create a Lithium-ion rechargeable battery. The C-rate of the AMT treated electrode material was compared to the C-rate of a Lithium nickel cobalt aluminum oxide battery (NCA battery).

Figure 8:
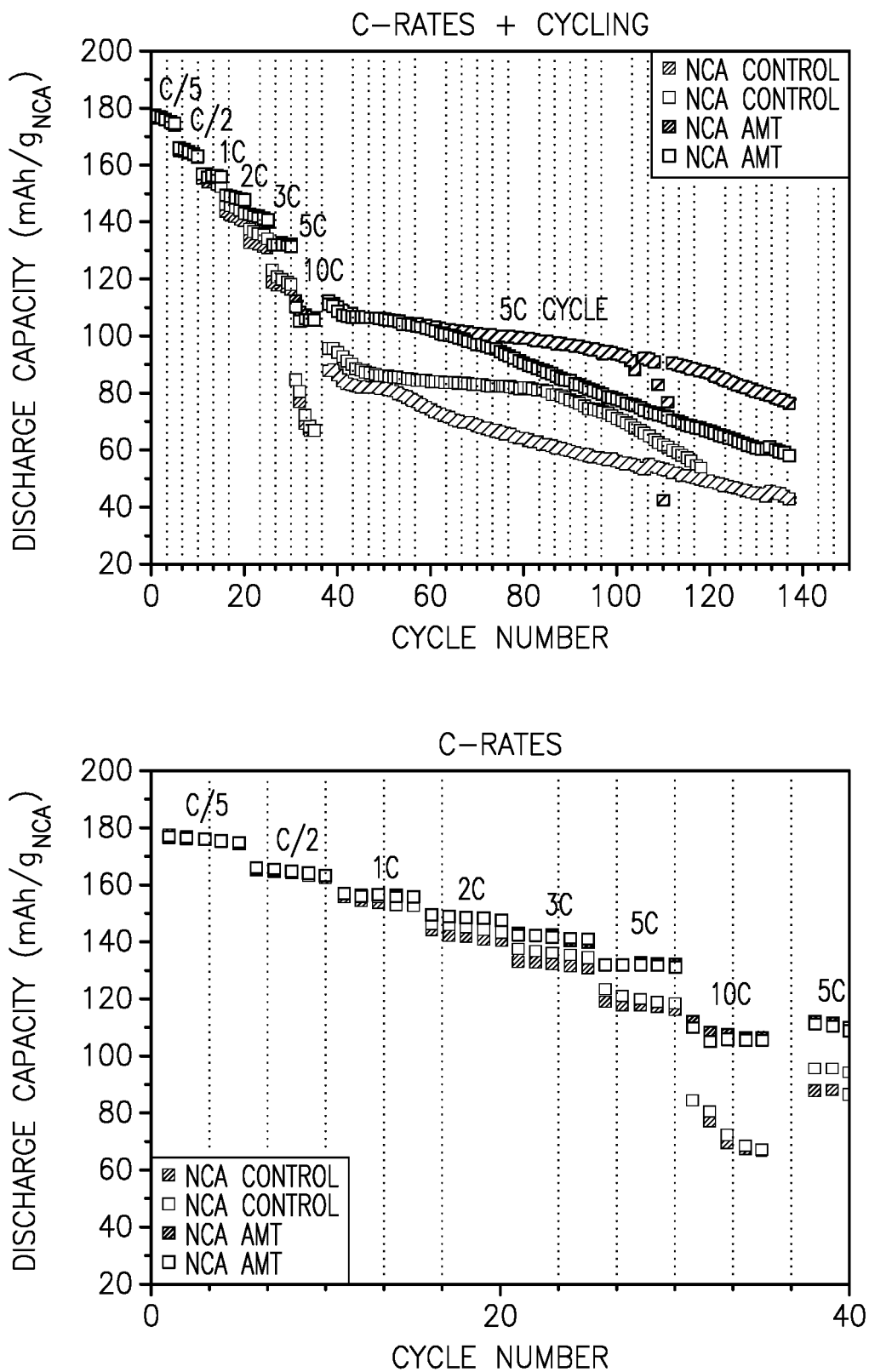
FIG. 8 is a graphical illustration of the results of the C-rate testing comparing a battery created with the AMT treated electrode material (NCA AMT) of the invention to a control battery (NCA Control)

Reference is now made to FIG. 8, which is a graphical illustration of the results of the C-rate testing comparing a battery created with the AMT treated electrode material to an NCA battery. As shown in FIG. 8, the AMT treated electrode battery (NCA AMT) produced a capacity increase comparatively to control battery (NCA Control), with the increase in capacity being in a range of 20% to 60%. Capacity increase was found to be higher for faster battery charge/discharge rates.

Figure 9:
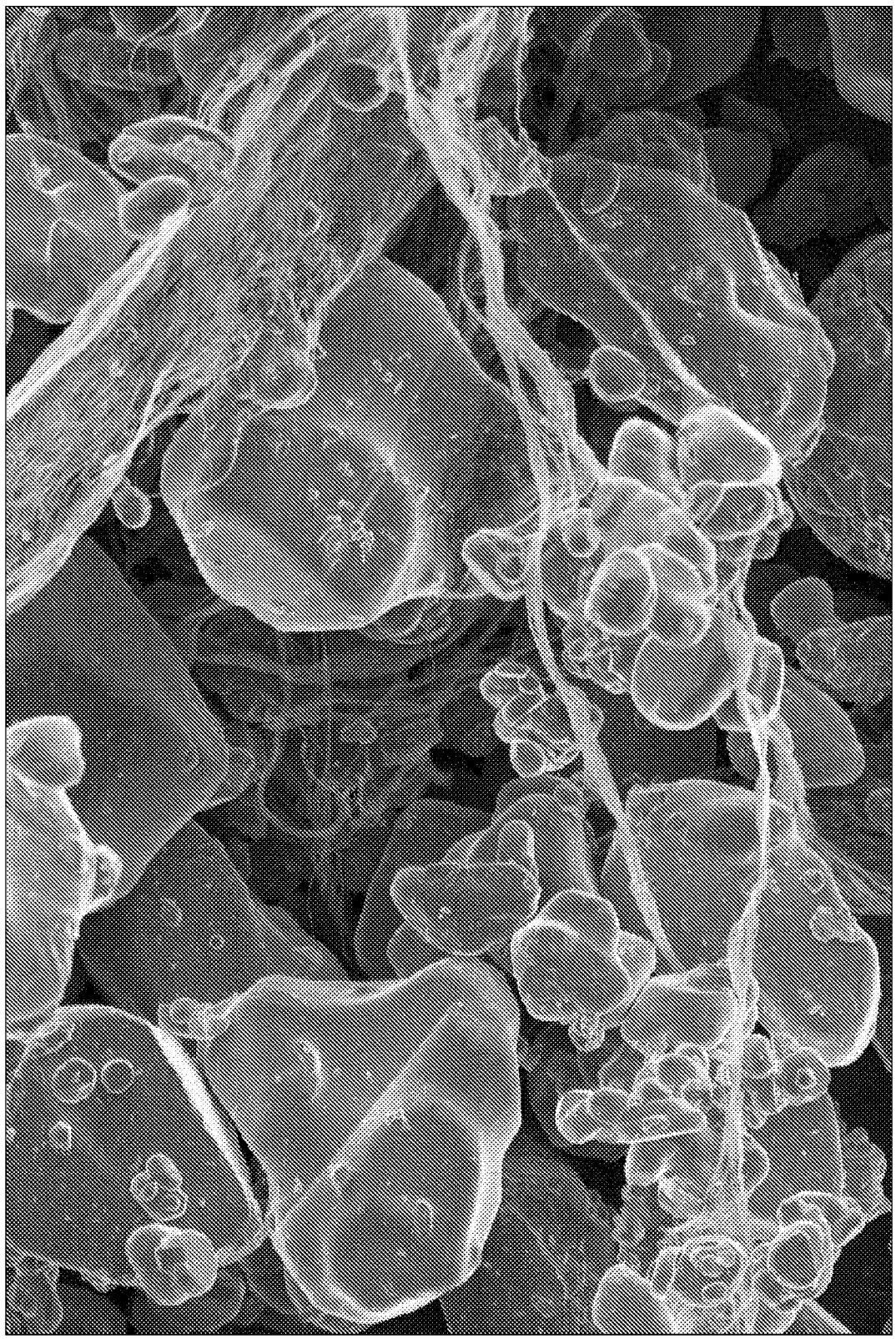
FIG. 9 is a scanning electron microscopy (SEM) photograph of CNTs dispersed on a lithium cobalt oxide (LCO) cathode.

An example of a dispersed CNT/electrode substrate matrix 27 is depicted in FIG. 9, which is a scanning electron microscopy (SEM) photograph of the CNTs dispersed on a lithium cobalt oxide (LCO) cathode.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the invention.

What is claimed is:

1. A method for dispersion of carbon nanotubes, the method comprising:
    (a) placing a powder of said carbon nanotubes into a treatment chamber;
    (b) introducing a treatment substance comprising carbon dioxide in a non-liquid form into the treatment chamber, said treatment substance being capable of undergoing cavitation; and
    (c) cavitating the treatment substance by injection of a jet stream of a supercritical carbon dioxide into a liquid carbon dioxide,
    wherein said cavitating applies mechanical stress to the treatment substance to cause the collapse of microscopic bubbles in the treatment substance, thereby causing the dispersion of said carbon nanotubes.

2. The method of claim 1, wherein said carbon nanotubes comprises at least one of: $TiO_2$, $Fe_2O_3$, organic fluorescent pigment from a rhodamine group, organic fluorescent pigment from a phtalocyanide group, corundum powder, and diamond powder.

3. The method of claim 1, further comprising forming a dispersed carbon nanotubes/electrode substrate matrix from said carbon nanotubes, wherein said placing of the carbon nanotubes powder comprises placing dry carbon nanotube powder mixed with an electrode substrate material into the treatment chamber, wherein the dispersed carbon nanotubes are free from added impurities due to a said mechanical cavitating being chemical-free, and wherein the carbon nanotubes having an electrical affinity to the electrode substrate material such that said carbon nanotubes establish stable contact with the electrode substrate material, thus forming the dispersed carbon nanotubes/electrode substrate matrix.

4. The method of claim 1, wherein the treatment substance is capable of undergoing a phase change, and wherein the method further comprises an increase of a temperature of the treatment chamber as a result of: 1) said supercritical carbon dioxide jet injection into said treatment substance, and 2) said cavitation, thereby inducing the phase change in the treatment substance.

5. The method of claim 1, wherein said cavitating comprises mechanically agitating the supercritical carbon dioxide.

6. The method of claim 5, wherein said mechanically agitating is done by rotating blades or cups.

7. The method of claim 1, wherein said cavitating further comprises repeatedly increasing and decreasing a pressure in the treatment chamber.

8. The method of claim 1, wherein said cavitation comprises providing a pressure gradient and pulling said carbon nanotubes powder into an injector via the pressure gradient.

9. The method of claim 1, further comprising removing the carbon nanotubes from the treatment chamber without changing a chemical composition of said carbon nanotubes powder.

10. The method of claim 1, further comprising using said carbon nanotubes in a battery.

* * * * *